(12) United States Patent
Yu et al.

(10) Patent No.: US 9,042,141 B2
(45) Date of Patent: May 26, 2015

(54) CONTROL OF ENERGY STORAGE SYSTEM INVERTER SYSTEM IN A MICROGRID APPLICATION

(71) Applicant: Caterpillar Inc., Peoria, IL (US)

(72) Inventors: Dachuan Yu, Normal, IL (US); Greg Speckhart, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 149 days.

(21) Appl. No.: 13/761,473

(22) Filed: Feb. 7, 2013

(65) Prior Publication Data

US 2014/0218985 A1 Aug. 7, 2014

(51) Int. Cl.
*H02M 3/24* (2006.01)
*H02M 7/44* (2006.01)
*G05F 1/00* (2006.01)
*H02M 7/537* (2006.01)

(52) U.S. Cl.
CPC .................................... *H02M 7/537* (2013.01)

(58) Field of Classification Search
USPC ........................... 363/95, 96, 97, 98; 323/282
IPC .................. H02M 3/33507,3/33584, 7/02, 7/42
See application file for complete search history.

(56) References Cited

U.S. PATENT DOCUMENTS

| 5,329,222 | A | * | 7/1994 | Gyugyi et al. | 323/207 |
|---|---|---|---|---|---|
| 6,686,718 | B2 | * | 2/2004 | Jadric et al. | 318/801 |
| 7,193,872 | B2 | * | 3/2007 | Siri | 363/95 |
| 7,324,361 | B2 | * | 1/2008 | Siri | 363/95 |
| 7,508,173 | B2 | | 3/2009 | Zhou et al. | |
| 7,855,906 | B2 | * | 12/2010 | Klodowski et al. | 363/97 |
| 8,068,352 | B2 | | 11/2011 | Yu et al. | |
| 8,143,856 | B2 | * | 3/2012 | Andrea et al. | 320/128 |
| 8,159,178 | B2 | | 4/2012 | Serban | |
| 8,674,668 | B2 | * | 3/2014 | Chisenga et al. | 323/266 |
| 8,773,873 | B2 | * | 7/2014 | Wagoner et al. | 363/40 |
| 2008/0205096 | A1 | * | 8/2008 | Lai et al. | 363/40 |
| 2009/0140576 | A1 | | 6/2009 | Yu et al. | |
| 2010/0157634 | A1 | | 6/2010 | Yu et al. | |
| 2011/0205773 | A1 | | 8/2011 | Wagoner et al. | |
| 2011/0304212 | A1 | | 12/2011 | Choi et al. | |

OTHER PUBLICATIONS

Godswill, et al.; *Design of DC-Link Voltage Cotnroller and DRid Current Controller in a PV-Inverter*; journal; vol. 2, Issue 4; May-Jun. 2012; pp. 1004-1013; Engineering Research and Application (IJERA); ISSN: 2248-9622; www.ijera.com.

Arulampalam, et al; *Control of Power Electronic Interfaces in Distributed Generation Microgrids*; journal; vol. 91, No. 9; Sep. 2004; pp. 503-523; Int. J. Electronics; Taylor & Francis Group; International Journal of Electronics; ISSN 0020-7217.

* cited by examiner

*Primary Examiner* — Emily P Pham
(74) *Attorney, Agent, or Firm* — Miller, Matthias & Hull LLP

(57) ABSTRACT

A system that manages a supplemental energy source connected to a power grid uses a two stage control strategy to manage power transfers in and out of the power grid as well as in and out of an energy storage system, such as a battery bank. One stage uses a non-linear transfer function to control an output frequency of a DC-to-AC inverter to limit undesired effects of power transients that occur on the grid. A second stage uses control strategy for transferring energy between the energy storage system and an internal DC link based on a relationship between a voltage on a DC link connecting the first and second stages and a DC link reference voltage, the voltage on the DC link, and a voltage at the energy storage system. The control strategy includes rapid charging, overcharging protection, and grid transient stabilization.

20 Claims, 9 Drawing Sheets

ESS Charge mode
(Amperes)

DC Link Voltage

| ESS Voltage | 0 V | 350 V | 400 V | 700 V | 800 V | 900 V |
|---|---|---|---|---|---|---|
| 320 V | 0 | 0 | 144 | 144 | 900 | 900 |
| 432 V | 0 | 0 | 108 | 108 | 900 | 900 |
| 436 V | -9 | 0 | 0 | 0 | 900 | 900 |
| 455 V | -9 | -9 | -9 | 0 | 450 | 450 |
| 470 V | -9 | -9 | -9 | -9 | 0 | 0 |

Fig. 10

ESS Discharge mode
(Amperes)

DC Link Voltage

| ESS Voltage | 0 V | 350 V | 400 V | 700 V | 800 V | 900 V |
|---|---|---|---|---|---|---|
| 320 V | 0 | 0 | 9 | 9 | 9 | 9 |
| 432 V | 0 | 0 | 9 | 9 | 9 | 9 |
| 436 V | -900 | -900 | -900 | -900 | 9 | 9 |
| 455 V | -900 | -900 | -900 | -900 | 9 | 9 |
| 470 V | -900 | -900 | -900 | -900 | 0 | 0 |

Fig. 11

CONTROL OF ENERGY STORAGE SYSTEM INVERTER SYSTEM IN A MICROGRID APPLICATION

TECHNICAL FIELD

The present disclosure relates to electrical power equipment and more specifically to an energy storage system inverter apparatus used in micro grid applications.

BACKGROUND

The frequency of a grid, particularly a large or "infinite" grid is relatively stable. All synchronous generators on the grid will synchronize to the grid frequency. Load on the grid is inversely proportional to grid frequency, so that as the load increases relative to the combined generator output, grid frequency decreases.

Droop frequency control is used in such synchronous generators to control power output. When a reference frequency is above a grid frequency, power is added to the prime move, e.g., more fuel is provided to an engine driving the generator, so that torque is increased and more power is output. Droop control systems use a linear function around the desired power level to manage the frequency of the output as a function of power.

Statcom systems are used in the utility power grid to provide reactive power compensation and transient voltage support. Statcom systems are generally capacitor banks and have very short duration operational times, in the order of seconds. U.S. Pat. No. 7,508,173 teaches use of an inverter to provide reactive power in a power distribution network.

In a microgrid application, a wide variety of power generation sources may contribute to a particular grid, including solar panels, wind turbines, diesel or gas generator sets, fuel cells, and even the utility grid. In this environment, power generation levels, frequency, and voltage may vary in a wide range due to the volatile nature of some of the power sources and sluggish response times of generator sets. Statcom systems may not have the capacity for grid support over the longer durations that may be occur in micro grid applications. In these cases, energy storage systems, using batteries, ultra capacitors, etc., may be used to provide supplemental power. However, energy storage systems (ESS) present additional requirements for long-term charge maintenance and ESS component protection.

SUMMARY OF THE DISCLOSURE

In an aspect, a system for managing power transfer with a power grid includes a direct current (DC) link, an energy storage system (ESS) that stores DC power, an energy storage controller coupled between the DC link and the ESS that manages power flow between the ESS and the DC link, and a load controller coupled between the DC link and the power grid. The load controller includes a DC-to-AC inverter. The load controller is operable to adjust an output frequency of the DC-to-AC inverter using a non-linear power-frequency curve responsive to both a state of a frequency of the power grid and a power transfer state of the load controller.

In another aspect, a method of managing power transfer to a power grid using a bidirectional DC-to-AC converter coupled between a power grid and an energy storage system (ESS) includes sensing a frequency of power on the grid, determining a power flow at the bidirectional DC-to-AC inverter, selecting a non-linear power-frequency curve, setting an output frequency of the bidirectional DC-to-AC inverter using the non-linear power-frequency curve and a current power flow through the bidirectional DC-to-AC inverter.

In yet another aspect, a system for managing power transfer between an energy storage system component and a power grid includes a direct current (DC) bus operatively coupled to the power grid, a DC energy storage system (ESS), a DC-to-DC converter coupled between the DC bus and the energy storage system, the DC-to-DC converter adapted for bi-directional current flow, and a controller coupled to the bidirectional DC-to-DC converter. The controller operates the DC-to-DC converter to control current magnitude and direction based on a relationship between a voltage on the DC link and a DC link reference voltage, the voltage on the DC link, and a voltage at the ESS to provide a plurality of charging and discharging modes.

BRIEF DESCRIPTION OF THE DRAWINGS

FIG. 10 is an exemplary table showing charge mode current flow limits for the 3D chart of FIG. 8; and FIG. 11 is an exemplary table showing discharge mode current flow limits for the 3D chart of FIG. 9.

DETAILED DESCRIPTION

Figure 1:
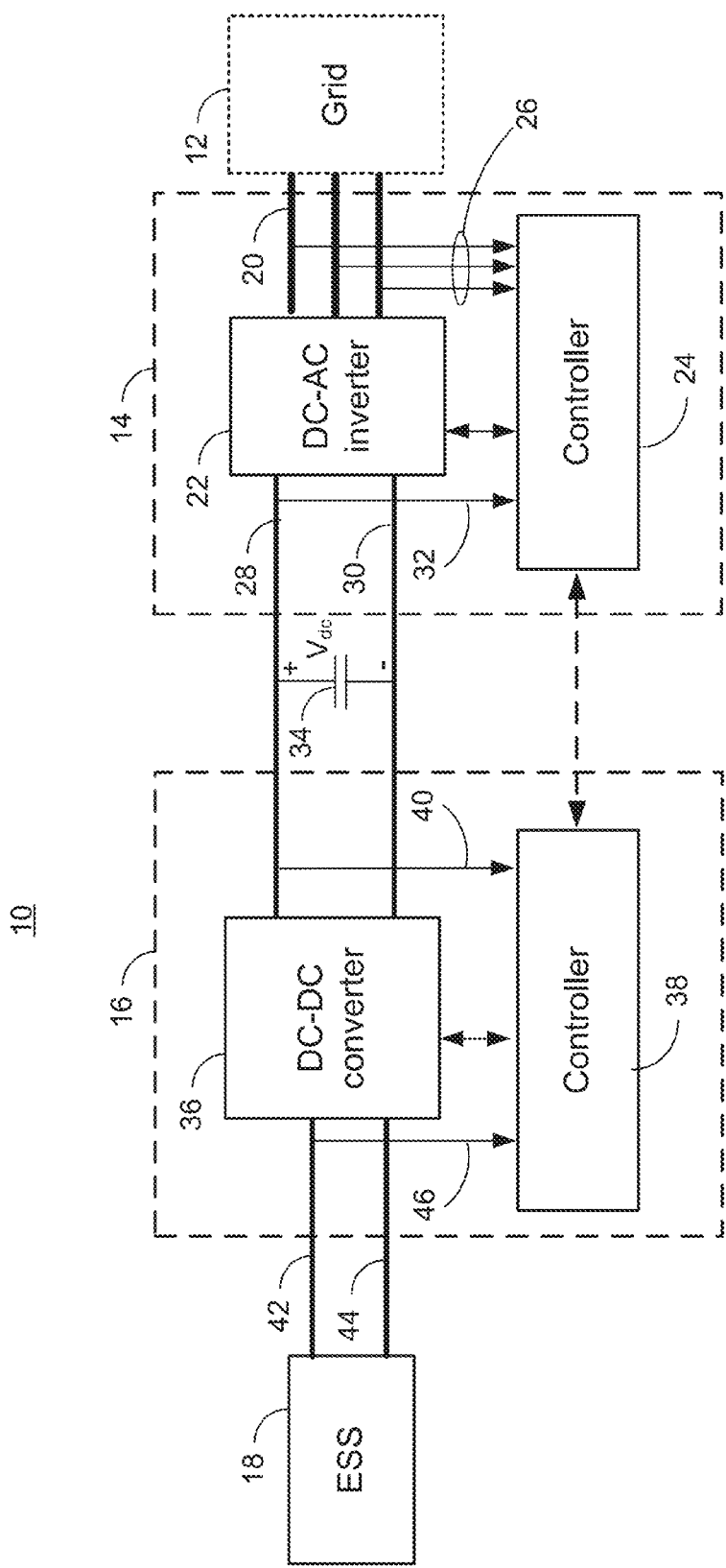
FIG. 1 is a block diagram illustrating a system for managing power transfer with a grid.

FIG. 1 is a block diagram illustrating a system 10 for managing power transfer with a grid 12. The system 10 includes a load manager 14, an energy storage system manager 16, and an energy storage system (ESS) 18. The grid 12 may be a microgrid and may include both loads and power sources (not depicted). The power sources may include solar panels, wind turbines, diesel or gas generator sets, fuel cells, and/or the utility grid. In an embodiment, the primary power source is a bank of fossil fuel generators. As the demand for power on the grid 12 increases, additional generators may be brought on line. In an embodiment, a nominal or target operating range of the grid may be 440 VAC±5% and 60 Hz±0.5 Hz. In other embodiments, other operating voltages, frequencies and nominal tolerances may be used. As will be discussed below, even though these represent target ranges operation outside these target ranges may occur for a number of reasons and may require steps to help bring operation back into the target range and thus limit damage to both the generating equipment and the loads.

The ESS 18 may be any combination of known energy storage devices, but particularly may include a battery bank, a capacitor bank, or a combination of the two. In an embodiment, the ESS 18 may be exclusively batteries.

The load manager 14 may be coupled to the grid 12 via a three-phase bus 20. The load manager 14 may include a DC-to-AC bi-directional inverter 22 and a load controller 24 with a sensor connection 26 for the three-phase grid 12. The load manager 14 may be connected to the ESS manager 16 by a DC bus 28 and a ground connection 30. In an embodiment, the ground connection 30 may be common to the ESS 18 and the system 10, but may be floating with respect to the grid 12. A sensor connection 32 couples the DC bus to the controller 24.

A capacitor 34 may be used to stabilize the voltage on the DC bus 28. Other filter arrangements may be used as well.

The ESS manager 16 may include a bidirectional converter (BDC) 36 and an ESS controller 38. The ESS controller 38 may have a sensor connection 40 to the DC bus 28 and a sensor connection 46 that reads a voltage on an ESS bus 42. An ESS ground 44 may be coupled to the DC bus ground 30.

Figure 2:
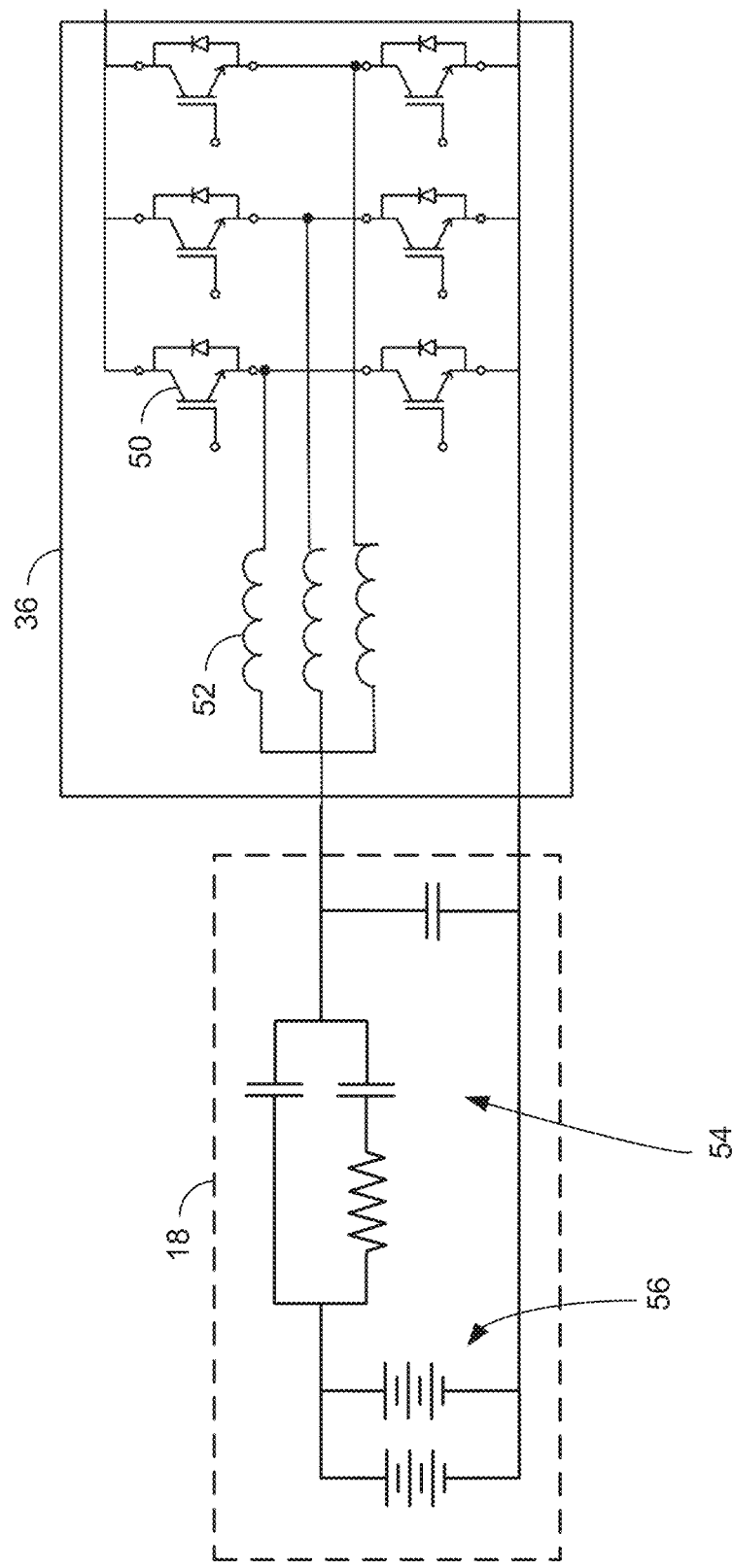
FIG. 2 is a block diagram illustrating a bidirectional DC-to-DC converter.

FIG. 2 is a block diagram illustrating the bidirectional converter 36. The BDC 36 uses pairs of switching transistors 50 to drive three inductors 52 in a conventional manner. Each of the switching transistors 50 may be an insulated gate bipolar transistor (IGBT), often used in high voltage and high current power applications.

The ESS 18 may include a filter circuit 54 and one or more batteries 56. In an embodiment, a capacitor bank (not depicted) may be used instead of, or alongside, the battery bank.

Figure 3:
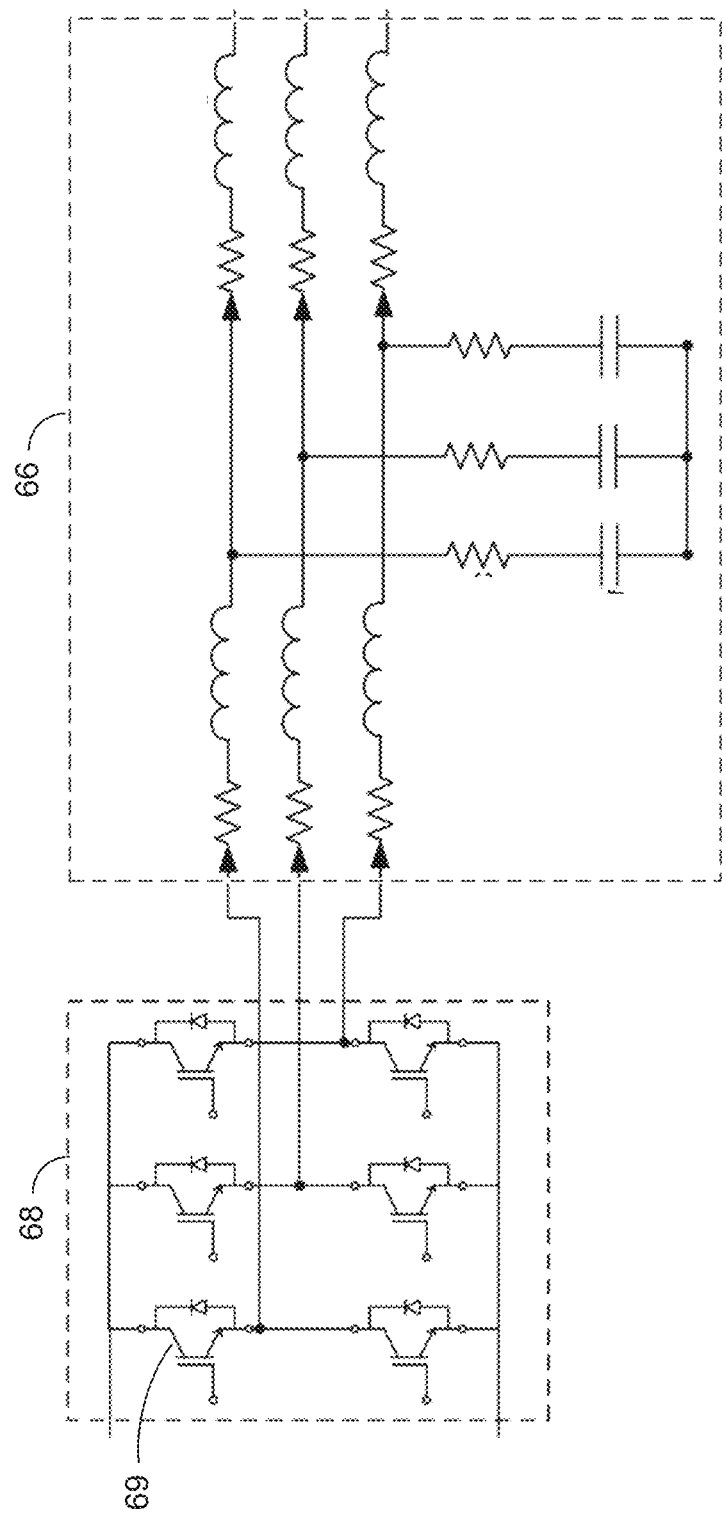
FIG. 3 is a block diagram illustrating a DC-to-AC bi-directional inverter.

FIG. 3 is a block diagram illustrating a DC-to-AC bi-directional inverter 22. The inverter 22 may include a filter 66 and a transistor bank 68. Like the BDC 36 of FIG. 2, the transistors 69 of the transistor bank 68 may be IGBTs.

The inverter circuits of FIGS. 2 and 3 use inductive elements to allow the inherent nature of inductors and fast switching IGBT transistors to adjust the voltage on an output side of the inverter above or below that of the input. This feature allows power transfer in either direction from the DC bus 28 without particular regard to the voltage either on the grid 20 or the ESS bus 42.

Figure 4:
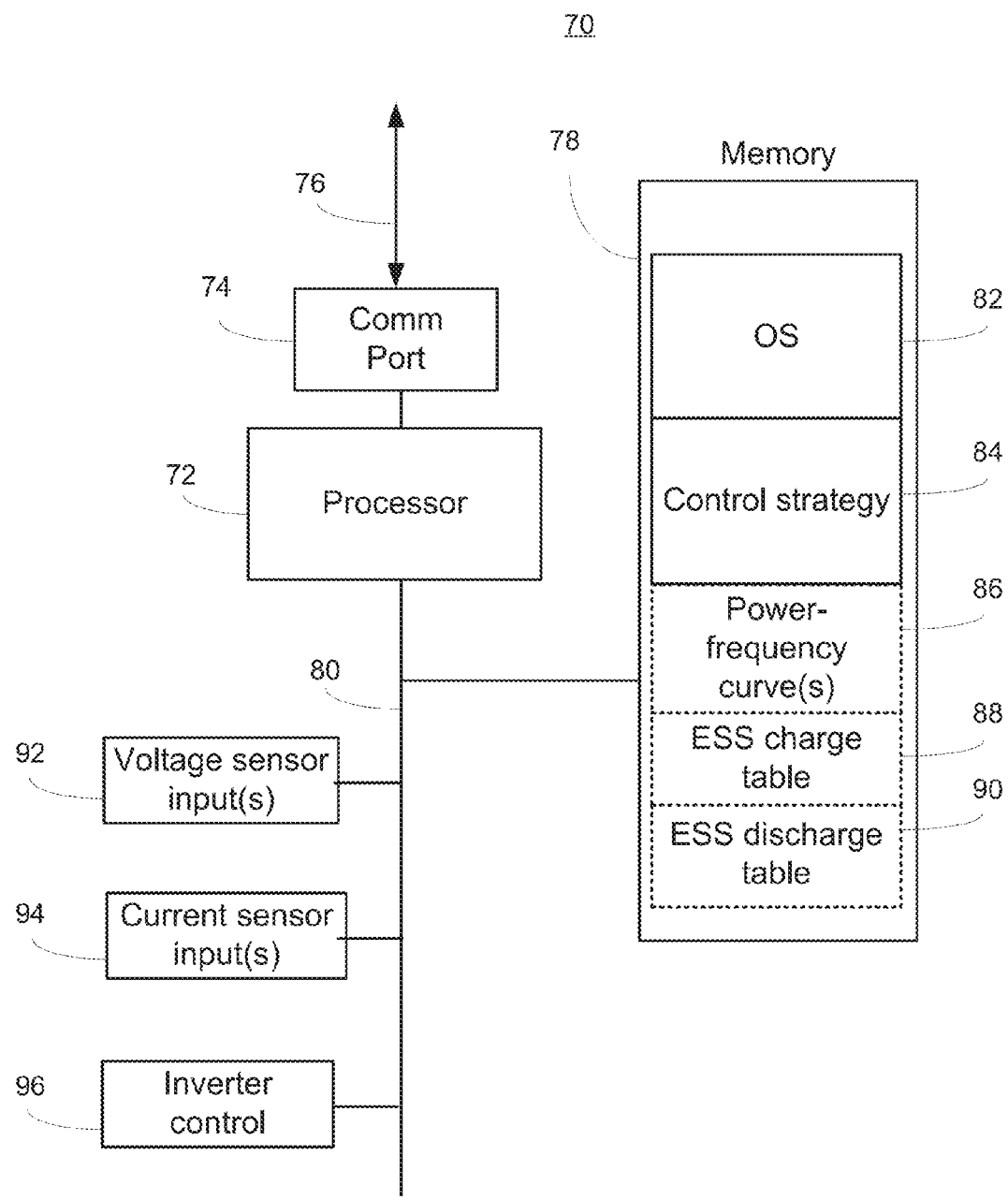
FIG. 4 is a block diagram of an exemplary controller suitable for use with a DC-to-AC inverter.

FIG. 4 is a block diagram of an exemplary controller 70 suitable for use with either a DC-to-DC converter or DC-to-AC inverter. The controller 70 may include a processor 72, a communication port 74, and a communication bus 76 that may be used to communicate information from controller 70 externally, for example with an external diagnostics or control computer (not depicted). In another embodiment, the communication bus 76 may be used to communicate information between instances of a load controller 24 and an ESS controller 38 so that grid and ESS status may be shared between the respective controllers.

The controller 70 may also include a memory 78 coupled to the processor 72 via a bus 80. The memory 78 may store computer executable modules, operational data, settings, etc. Information stored in the memory 78 may include an operating system 82 and a control strategy 84. The control strategy 84 may define functions specific to a particular controller application such as the load controller 24 or the ESS controller 38. However, in an embodiment, the controller 70 may include strategy modules capable of addressing both the load controller and the ESS controller functions so that a particular controller 70 may be used in either application. In yet another embodiment, both the load controller 24 and the ESS controller 38 may be embodied in a single electronic device. Operational data and settings stored in memory 78 may include power frequency curves 86, an ESS charge table 88 and an ESS discharge table 90.

The controller 70 may also include inputs capable of receiving and processing voltage and current information, for example at a voltage sensor input 92 and a current sensor input 94. The voltage sensor input 92 and current sensor input 94 may have signal conditioning circuitry, such as analog to digital converters and/or a voltage measuring circuit. The controller 70 may also include one or more inverter control outputs 96 capable of driving inverter switching transistors. In some embodiments, the controller 70 or portions thereof may be embodied in a field programmable gate array (FPGA), a single chip computer, or some combination of those elements and the above-described architecture.

Industrial Applicability

The system 10 may operate to support the broad functions of supporting the grid 12 and keeping the ESS 18 charged and in condition for operation. Supporting the grid 12 may include providing power to the grid 12 when the generators are off-line or unable to supply the power demanded by the grid load. Supporting the grid 12 may also include providing reactive power as needed. Additionally, the system 10 may provide a short-term high current sinking capability to offset a transient power spike, for example, as may occur when a high current load is disconnected from the grid 12.

The other function of keeping the ESS 18 charged and in condition for operation may include providing rapid charging when the ESS 18 is depleted, providing a trickle charge to maintain a nominal power level, and providing a trickle drain when the ESS is in an over charged state. The system 10 may also protect the ESS 18 and other internal components from damage caused by a power surge when the grid frequency increases, particularly when grid frequency increases well above a nominal operating state, as may occur when standalone generators or renewable energy sources are primary drivers on the grid 12.

Use of the system 10 provides a comprehensive ability manage a wide range of conditions associated with micro grid operation, particularly when renewable power sources are part of the generation process including undervoltage and overvoltage correction, reactive power compensation, and up to 100% power replacement when other grid sources are unavailable.

In operation, the two major functions of the system 10, ESS management and grid support, may be reduced to two conceptual transfer functions modeled by specialized transfer functions. Using directly-measured inputs, the respective transfer functions control the DC-to-AC inverter 22 and the DC-to-DC converter 36 in accordance with its respective transfer function.

Figure 5:
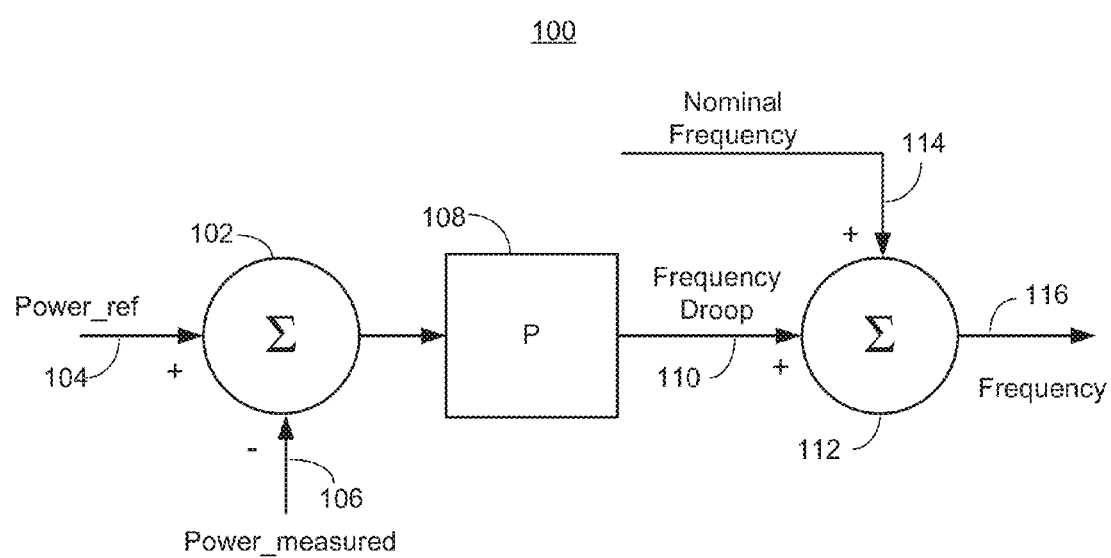
FIG. 5 is a control diagram for a droop frequency control scheme.

FIG. 5 is a control diagram 100 for a droop frequency control scheme suitable for use in managing power interactions between the system 10 and the grid 12. The control diagram illustrates a summation node 102 with inputs for a reference power value 104 and a measured power at a connection point 106 to the grid 12, such as at bus 20. The output of the summation node 102 is a difference value that drives a proportional controller 108. The proportional controller 108 outputs a droop frequency 110, which may be positive or negative, as a function of the power difference presented at its input. A second summation node 112 adds the droop frequency 110 to a nominal frequency reference 114 resulting in an output frequency 116 that is used to set the output frequency of the AC-to-DC inverter 22. The proportional controller 108 may implement a non-linear transfer function illustrated in FIG. 6.

Figure 6:
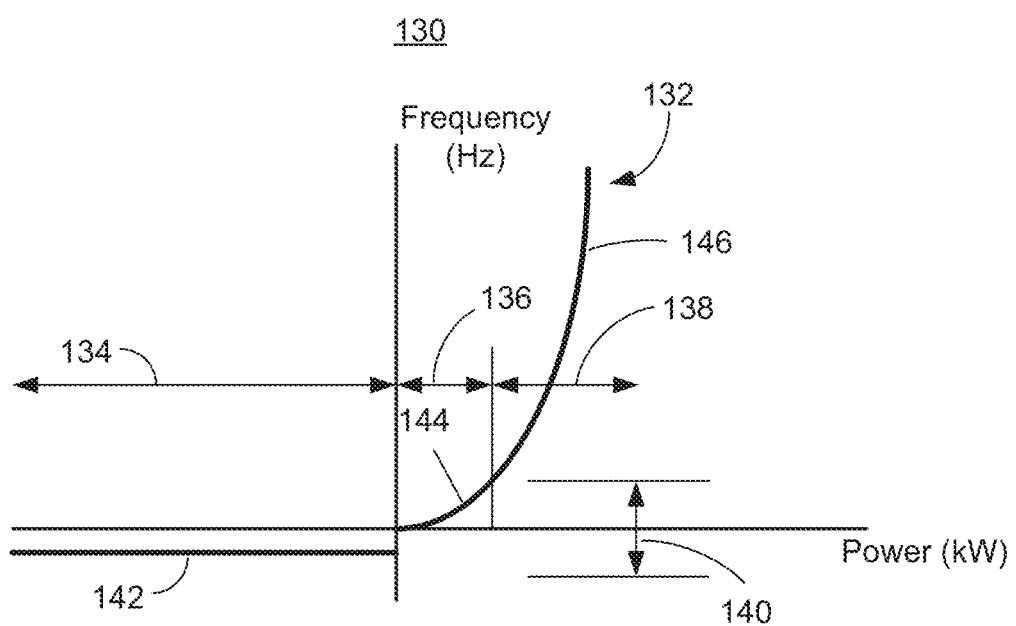
FIG. 6 is a depiction of an exemplary non-linear power frequency curve for use by the droop frequency control scheme of FIG. 5.

FIG. 6, illustrates a chart 130 of exemplary non-linear power-frequency curve 132. As can be seen, and as is discussed below, even though a particular region may be linear, the overall curve 132 is non-linear. More than one power-frequency curve may be available and may be selected for use based on factors including, but not limited to, grid power sources, expected loads, power quality expectations, etc.

The chart 130 shows a discharge region 134, a charging region 136, and an power rejection region 138. A nominal frequency range 140 indicates output, that is, grid, frequencies that fall within an desired operating range. For example, in a 60 Hz environment, a micro grid may operate with a target frequency specification of 60 Hz±0.5 Hz. When the system 10 is operating in the discharge region 134, that is, providing power to the grid 12, the system 10 is substantially responsible for the frequency at the grid 12. To stabilize that frequency, a portion 142 of the power-frequency curve 132 may be used that has a flat, constant frequency within the desired nominal frequency range 140 for all levels of power. When operated using this portion 142 of the power-frequency curve, the system will supply a full range of power with a constant frequency.

When the system 10 is charging the ESS 18, power is flowing into the load manager 14. The frequency of the DC-to-AC bi-directional inverter 22 is held within the nominal range 140 using a portion 144 of the power-frequency curve 132. The portion 144 may have a low positive slope and may be curved as shown, or may be a straight line. The low slew rate of the portion 144 improves the stability of a power control loop of the system 10. That is, small changes in power result in small changes in frequency.

In a condition occurs, such as a sudden and substantial decrease in power consumption, a generator providing power to the grid 12 may not be able to adjust its power output quickly enough and as a result it output may increase in both voltage and frequency. In some cases, the frequency may well exceed the nominal range and may exceed 63 Hz. Applying the known characteristics of phasor addition, power will flow from a higher frequency to a lower frequency source. In such a case, the load manager 14 may be suddenly overwhelmed with a power surge coming from the grid.

Using the curve portion 146 in the power rejection region 138 allows the system 10, and more specifically, the load manager 14 to rapidly increase its own frequency to reject the power injection from the generator set or sets.

Note that the power-frequency curve 132 may be characterized as a single curve or may be a composite of three or more separate curves. In some embodiments, the curve 132 may be continuous or may have discontinuities, such as at the transition between charging and discharging. In addition, the curve 132 may be described via an algorithm, that is, an equation or may be embodied in a table or other transform function.

Figure 7:
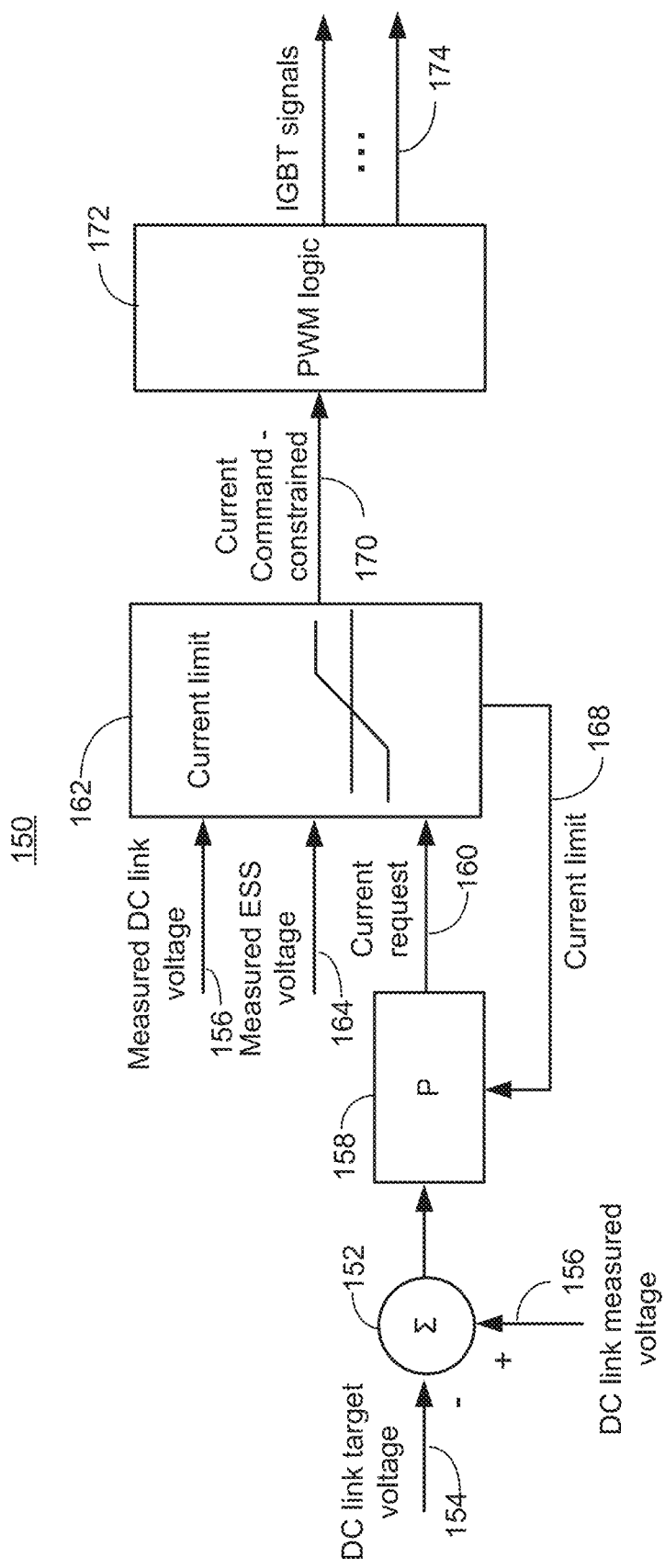
FIG. 7 is a control diagram for managing current flow with an energy storage system (ESS)

FIG. 7 is a control diagram 150 for a control scheme for managing current flow with an energy storage system (ESS). Simply put, the control scheme attempts to maintain the voltage at the DC link 28 at a reference voltage. The control diagram 150 may include a summation node 152 with an inverted DC link target voltage 154 and a voltage 156 measured at the DC link 28. The output of the summation node 152 is a difference value between the voltages. A proportional controller 158 may be used to convert and/or scale the voltage difference to a requested current value 160 that is input to a current limit block 162. In an embodiment, the transfer function of the proportional controller 158 is a simple linear function. The requested current value 160 has both magnitude and sign.

The current limit block or function 162 uses the requested current value sign and magnitude, an ESS voltage value 164, for example measured at the output 42 of the ESS 18, and a measured voltage 156 at the DC link 28. As illustrated in the current limit block 162, a transfer function of current request value 160 is converted to an current command 170 having limited maximum positive and negative values. The selection of the values is discussed further below.

The current command 170 may be provided to a pulse-width modulated (PWM) block 172 that may use a known technique for generating control signals to the individual IGBT transistors 50 of the DC-to-DC converter (BDC) 36. A feedback loop 168 from the current limit block 162 to the proportional controller 158 may be available for use in filtering the proportional controller response.

Figure 8:
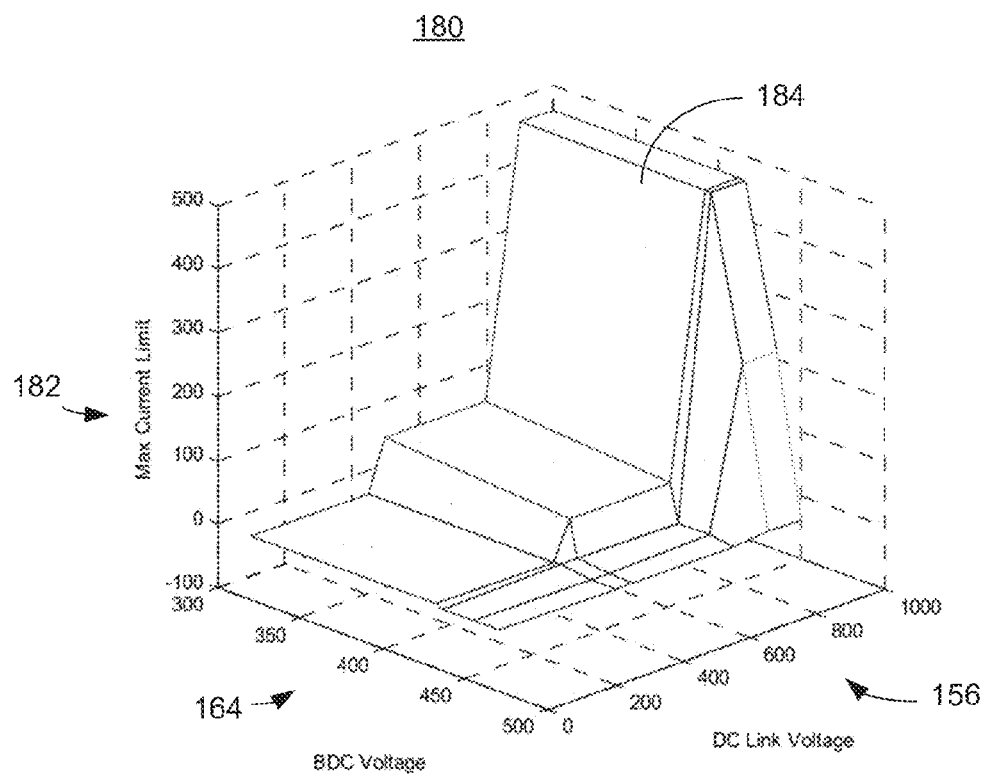
FIG. 8 is a three dimensional (3D) chart of current limits for charging the ESS.

FIG. 8 is an exemplary three dimensional (3D) chart 180 of current limits for charging the ESS 18, that is when the DC link voltage 156 is above the DC link target voltage 154 and the ESS manager 16 operates, in general, to lower the DC link voltage 156. As shown in the control diagram 150, output of the current limit block 162 is a function of both the current request 160 and a maximum allowable current 188 taken from the chart 180. To determine the maximum allowable current 188, the BDC voltage 164 and the DC link voltage 156 may define a point on the x-y-plane of the chart 180 associated with a maximum current value 182 associated with the 3D sheet 184. This value may be used by the PWM logic 172 if the current request value 160 is greater than the value from the chart 180. If the current request value 160 is less than the value from the chart, the current request value 160 may be supplied to the PWM logic 172.

Figure 9:
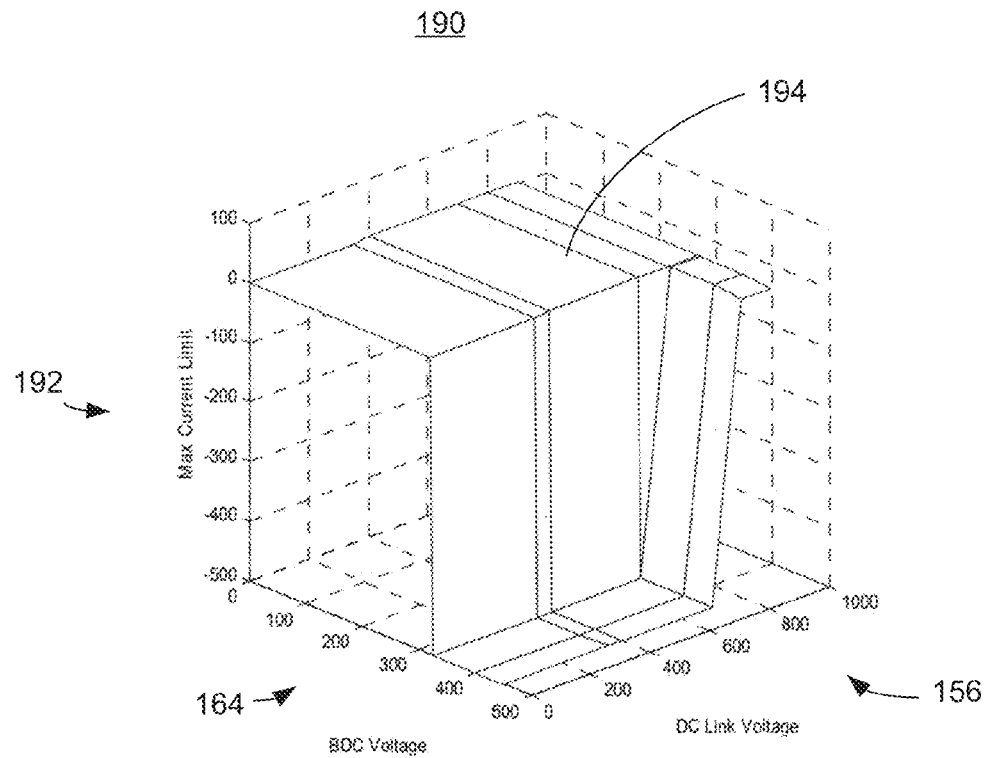
FIG. 9 is a 3D chart of current limits for discharging the ESS.

FIG. 9 is a similar 3D chart 190 for discharging the ESS 18, for example, when the DC link voltage 156 is below the target DC link voltage 154 and the ESS manager 16 operates, in general, to increase the DC link voltage 156. In similar fashion as described above, the chart 190 places maximum current 192 constraints on the BDC 36 based on BDC voltage 164 and the DC link voltage 156. If the current request value 160 is below the maximum, the requested value will be used to control the PWM logic 172.

Referring to FIG. 10, a table 200 further illustrates exemplary maximum current limits for charge mode current flow at the ESS 18 via the BDC 36. In this exemplary embodiment, the ESS 18 may have a nominal, fully charged, no load, voltage of 436 V. In other embodiments, another ESS may have a different storage element construction or may have a different number of cells that would affect nominal voltage. In the table 200, the DC Link voltage 156 is shown across the top, and ESS voltage 164 is shown on the left.

Both the table 200 and the table 210 following in FIG. 12 depict maximum current values that may occur in different conditions. However, as described above, any actual current at the BDC 36 will be a function of the difference between the DC link voltage 156 and the DC link reference voltage 154 and the maximum current specified in appropriate table. Some areas of each table may not be reached for a given reference voltage 154. In an embodiment, the reference voltage 154 may be 660 V.

The table 200 is appropriate when the DC link voltage 156 is above the reference voltage 154. In the charging mode, several charging current maximums may be imposed. For example, if the ESS voltage 166 is at or below an exemplary nominal value of 432 V and the DC link voltage is at 700 V, a maximum charging current of either 144 amps or 108 amps may be imposed in region 202. As discussed above, the maximum is only used when the current request is above the maximum value. If, on the other hand, the DC link voltage 156 is above its reference voltage 154 (that is, in charging mode), but the BDC voltage 164 is high compared to its nominal value at 470 V, in region 206, the maximum current may be set to −9 amps or a similar low value to provide a trickle discharge of the ESS 18. The proportional controller 158 may set the current request to a negative value based on the feedback current limit signal 168 or for another condition.

Region 204 may be entered when the DC link voltage 156 is substantially above the reference voltage 154 and the ESS voltage 164 is near a nominal value or below. This mode of operation may be encountered during a transient, such as described above where a power surge on the grid causes the load controller 14 to sink power from the grid 12, even as the load controller 14 raises its frequency to reject a portion of the incoming power. By sinking up to 900 amps, the ESS 18 may bleed enough power from the grid 12 to reduce a high voltage situation caused by the load dump transient.

FIG. 11, is a table 210 illustrates exemplary maximum discharge mode current flow at the ESS 18 via the BDC 36. As above, the nominal voltage at the ESS 18 may be 436 V and the reference DC link voltage 156 may be 660 V, although other voltage levels may be accommodated. Table 210 is active whenever the DC link voltage 156 is below the DC link voltage reference 154. The region 212 may set the current limit at −900 amps when the DC link voltage 156 is low and the ESS voltage 164 is at or above is rated value. A cap of −900 powers the DC link 28 so the load controller 14 can supply power to the grid 12. When the ESS voltage 164 is below the nominal, the maximum current limit may be set to zero even if the DC link voltage is still low in order to protect the batteries in the ESS 18. If the DC link voltage 156 is below the reference 154 but the ESS voltage 164 is low, the current limit block 162 may set the maximum current to 9, or a similar low value to provide a trickle charge of the ESS 18. With the current limit set at the positive value, the proportional controller 158 may set the current request value 160 to a positive number even though the discharge mode is active based on the current limit feedback value 168.

As can be seen, the ESS manager 16 using the bidirectional DC-to-DC converter 36 and a simple control function 150 operates seamlessly between charging and discharging modes based solely on measured voltage values and does not depend on state transitions or other explicit evaluations based on power levels or current measurements to both reduce complexity and increase response times.

The specific voltages, currents, and current limits used for illustration above are exemplary of an instance of an embodiment. Any of these values may vary in a 10% range or even a 20% range or more. The exact set points for a particular installation may vary from those described based on the type of power sources available on the grid, the mix of power sources, and energy efficiency considerations. For example, a micro-grid operated primarily on wind turbines may have a slightly lower slope on the power rejection curve 146 because frequency variations may be more common. In another example, the maximum current for grid support may be more or less based on an expected maximum load. In an embodiment, current values in tables 200 and 210 may be adjusted during operation to reflect changes in load, changes in generation equipment, or to reflect wear and reduced capacity of the ESS 18 over time. Similarly, the DC link reference voltage may be varied in real time based on grid conditions, environmental conditions, such as ambient temperature, etc.

What is claimed is:

1. A system for managing power transfer with a power grid comprising:
    a direct current (DC) link;
    an energy storage system (ESS) that stores DC power;
    an energy storage controller coupled between the DC link and the ESS that manages power flow between the ESS and the DC link; and
    a load manager coupled between the DC link and the power grid, the load manager including a DC-to-AC inverter, the load manager further including a load controller operable to adjust an output frequency of the DC-to-AC inverter using a non-linear power-frequency curve responsive to both a state of a frequency of the power grid and a power transfer state of the load manager.

2. The system of claim 1, wherein non-linear transfer curve has at least three regimes.

3. The system of claim 2, wherein the non-linear transfer curve has a first regime with a constant frequency (flat slope) active when power from the ESS is supplied to the power grid.

4. The system of claim 3, wherein the non-linear transfer curve has a second regime with a low positive slope active when charging the ESS.

5. The system of claim 4, wherein the low positive slope has a slope less than or equal to 1.

6. The system of claim 3, wherein the non-linear transfer curve has a third regime with an exponential positive slope, the third regime active when a power grid frequency rises above a target frequency during a grid transient.

7. The system of claim 1, wherein the energy storage controller is operated to sink or source current based on a relationship between a voltage on the DC link and a DC link reference voltage.

8. The system of claim 7, wherein a current limit function imposes a maximum current value and direction for the ESS controller according a current request value based on the relationship between the voltage on the DC link and the DC link reference voltage, the voltage on the DC link, and a voltage at the ESS.

9. A method of managing power transfer to a power grid using a bidirectional DC-to-AC inverter coupled between the power grid and an energy storage system (ESS), the method comprising:
    sensing a frequency of power on the power grid;
    determining a power flow at the bidirectional DC-to-AC inverter;
    selecting a non-linear power-frequency curve;
    setting an output frequency of the bidirectional DC-to-AC inverter using the non-linear power-frequency curve and a current power flow through the bidirectional DC-to-AC inverter.

10. The method of claim 9, wherein selecting the non-linear power-frequency curve comprises selecting the non-linear power-frequency curve having a flat slope when the power flow is from the ESS to the power grid.

11. The method of claim 10, wherein selecting the non-linear power-frequency curve comprises selecting the non-linear power-frequency curve having a portion with a positive slope when the power flow is from the power grid to the ESS during charging of the ESS.

12. The method of claim 11, wherein selecting the non-linear power-frequency curve comprises selecting the non-linear power-frequency curve having a positive exponential slope when the power flow is from the power grid to the ESS and a power grid frequency is above a specified target range of frequency.

13. A system for managing power transfer between an energy storage system component and a power grid, the system comprising:
    a direct current (DC) link operatively coupled to the power grid;
    a DC energy storage system (ESS);

a DC-to-DC converter coupled between the DC link and the ESS, the DC-to-DC converter adapted for bi-directional current flow; and a controller coupled to the dc-to-dc converter that operates the DC-to-DC converter to control current magnitude and direction based on i) a relationship between a voltage on the DC link and a DC link reference voltage, ii) the voltage on the DC link, and iii) a voltage at the ESS to provide a plurality of charging and discharging modes.

14. The system of claim 13, wherein a first charging mode provides a rapid charge current into the ESS.

15. The system of claim 14, wherein a second charging mode provides a charge maintenance current from the DC link to the ESS.

16. The system of claim 15, wherein the rapid charge current is at least an order of magnitude greater than the charge maintenance current.

17. The system of claim 14, wherein the rapid charge current is capped below a level that would cause the power grid to activate an additional generator to supply power required to meet a demand of rapid charge current if not capped.

18. The system of claim 13, wherein a third charging mode provides a high current sink from the power grid to the ESS via the DC link when a power grid transient causes a high voltage condition on the DC link.

19. The system of claim 13, wherein a first discharging mode supplies current from the ESS to the DC link so that the ESS is a primary source of power on the power grid.

20. The system of claim 19, wherein a second discharging mode supplies a trickle charge current to the ESS from the DC link.

* * * * *